US012768528B2

(12) United States Patent
Hoffmann

(10) Patent No.: US 12,768,528 B2
(45) Date of Patent: Oct. 20, 2026

(54) LUMINAIRE, ESPECIALLY FOR AN EXPLOSIVE ENVIRONMENT

(71) Applicant: DOUBLEPOWER!! S.R.O., Prague (CZ)

(72) Inventor: Matej Hoffmann, Slany (CZ)

(73) Assignee: DOUBLEPOWER !! S.R.O., Prague (CZ)

( * ) Notice: Subject to any disclaimer, the term of this patent is extended or adjusted under 35 U.S.C. 154(b) by 0 days.

(21) Appl. No.: 19/144,826

(22) PCT Filed: Nov. 30, 2023

(86) PCT No.: PCT/CZ2023/000045
§ 371 (c)(1),
(2) Date: Jun. 30, 2025

(87) PCT Pub. No.: WO2024/146663
PCT Pub. Date: Jul. 11, 2024

(65) Prior Publication Data
US 2026/0218892 A1 Jul. 30, 2026

(30) Foreign Application Priority Data
Jan. 6, 2023 (CZ) .................................. PV 2023-5

(51) Int. Cl.
*F21V 25/12* (2006.01)
*F21V 23/00* (2015.01)
(Continued)

(52) U.S. Cl.
CPC ............ *F21V 25/12* (2013.01); *F21V 23/002* (2013.01); *F21V 23/009* (2013.01);
(Continued)

(58) Field of Classification Search
CPC ........ F21V 25/12; F21V 25/125; F21V 31/03; F21V 31/005; F21V 23/009; F21V 23/002
See application file for complete search history.

(56) References Cited

U.S. PATENT DOCUMENTS

| | | | | |
|---|---|---|---|---|
| 6,994,621 | B2 * | 2/2006 | Mashiko | F21S 45/30 362/345 |
| 9,295,949 | B2 * | 3/2016 | Uemura | B01D 69/02 |

(Continued)

FOREIGN PATENT DOCUMENTS

| | | |
|---|---|---|
| CN | 102798090 B | 1/2015 |
| CN | 209726071 U | 12/2019 |

(Continued)

OTHER PUBLICATIONS

PCT Search Report and Written Opinion dated Feb. 9, 2024 for related PCT Patent Application No. PCT/CZ2023/000045, 8 pages.

*Primary Examiner* — William N Harris
(74) *Attorney, Agent, or Firm* — Hovey Williams LLP; Paul J. Walker

(57) ABSTRACT

A luminaire, especially for an explosive environment, comprising an enclosed housing (1) in which a light source (2) is arranged with a power supply and electronic circuitry (3). The housing (1) is fitted with a bushing (4) for cables. The housing (1) is divided with a partition (5) into a light source (2) chamber (6), and into an electronic circuitry (3) chamber (7). In the partition (5) between the chambers (6, 7), a grommet (8) for cables is arranged as well as a pressure equalizer (9) Ex d. The electronic circuitry (3) chamber (7) is fitted with a bushing (4) for cables, and is interconnected with the external environment with a pressure equalizer (10) Ex e.

4 Claims, 4 Drawing Sheets

(51) Int. Cl.
*F21V 31/00* (2006.01)
*F21V 31/03* (2006.01)
*F21Y 115/10* (2016.01)

(52) U.S. Cl.
CPC .......... *F21V 25/125* (2013.01); *F21V 31/005* (2013.01); *F21V 31/03* (2013.01); *F21Y 2115/10* (2016.08)

(56) References Cited

U.S. PATENT DOCUMENTS

| | | | | |
|---|---|---|---|---|
| 11,371,689 | B2 * | 6/2022 | Rössler | F21V 25/12 |
| 11,774,070 | B2 * | 10/2023 | Chavan | F21V 15/01<br>362/294 |
| 2014/0047981 | A1 * | 2/2014 | Uemura | B01D 69/10<br>96/4 |

FOREIGN PATENT DOCUMENTS

| | | | |
|---|---|---|---|
| CN | 105627195 | B | 5/2020 |
| EP | 1363069 | A2 | 11/2003 |
| GB | 2270639 | A | 3/1994 |

* cited by examiner

LUMINAIRE, ESPECIALLY FOR AN EXPLOSIVE ENVIRONMENT

RELATED APPLICATIONS

This application is the National Stage of International Patent Application No. PCT/CZ2023/000045, filed Nov. 30, 2023, which is hereby incorporated herein by reference in its entirety, and which claims priority to Czech Patent Application No. PV 2023-5, filed Jan. 6, 2023, which is also incorporated herein by reference in its entirety.

TECHNICAL FIELD

The invention relates to a luminaire, especially for an explosive environment, comprising an enclosed housing in which the light source is arranged with a power supply and electronic circuitry, and the housing is fitted with a bushing for cables.

BACKGROUND ART

Manufacturers of illumination for explosive environments use several basic types of protection that are specified by standards of the EN 60079 series (harmonized ČSN EN 60079, international IEC 60079). Thus, there are multiple ways to prevent ignition of the ambient atmosphere by electrical apparatus. The most commonly applied methods of protection for luminaires are set forth in the following standards:

EN 60079-0: Explosive atmospheres
EN 60079-1: Gas—Flameproof enclosure "d"
EN 60079-7: Gas—Increased safety "e"
EN 60079-11: Gas—Intrinsic safety "I"
EN 60079-15: Gas—Type of protection "n"
EN 60079-18: Gas and dust—Encapsulation "m"
EN 60079-31: Dust—Protection by enclosure "t"

In this technical field, the following identifications are used:

- Ex e—Identification of protection using—EN 60079-7: Gas—Increased safety "e"
- Ex d—Identification of protection using—EN 60079-1: Gas—Flameproof enclosure "d"
- Ex de—Identification of protection using—EN 60079-7: Gas—Increased safety "e" and EN 60079-1: Flameproof enclosure "d"
- Ext—Identification of protection using—EN 60079-31: Dust—Protection by enclosure "t"
- IP rating—IP—Ingress Protection—indicates protection of electrical apparatus from ingress of a foreign body and ingress of liquids
- IP 66—Complete protection from ingress of dust and against intensively sprayed water
- IP 68—Complete protection from ingress of dust and protection from immersion in water
- LED—Light-Emitting Diode is a diode emitting light, which means that it is a light source
- Zone 1/21—Combination of the following terms: Zone 1—An area in which an explosive atmosphere is likely to occur occasionally in normal operation Zone 21—An area in which an explosive atmosphere consisting of a mixture with air or flammable substances in the form of powder or dust is likely to occur in normal operation occasionally Designs of luminaires are known where the space with the electronic circuitry and the light sources, currently usually consisting of LED chips, are enclosed in a chamber that has the protection method Ex d (EN 60079-1), Ex t (EN 60079-31), 5 and the manufacturers usually strive to achieve the ingress protection ratings IP66 and IP68.

A disadvantage of this solution is the risk of condensation of water vapour in the chamber in luminaires of structural designs that mainly use puttied joints and achieve a high IP rating. Here, the system is completely or partly sealed. Changes of the inner temperature due to heat losses cause heating of the inner atmosphere of the chamber during operation, which leads to changes of pressure in the chamber. Considering the temperature gradient between the environment and the inner space, the risk of water condensation in the inner space is many times higher.

Condensation of water results in damage of sensitive electronic components, which leads to a loss of functionality of the device. In addition, if condensate occurs on transparent parts of the luminaire, it will affect the overall efficiency and the lighting direction, thus reducing the general illumination performance.

It is the object of the invention to provide such a construction of a luminaire for an explosive environment that will resolve the shortcomings of the prior art.

SUMMARY OF THE INVENTION

The said object is achieved with a luminaire, especially for an explosive environment, comprising an enclosed housing in which a light source is arranged with a power supply and electronic circuitry, and the housing is fitted with a bushing for cables, according to the invention the principle of which is that the housing is divided with a partition into a light source chamber and an electronic circuitry chamber wherein the partition between the chambers comprises a grommet for cables as well as a pressure equalizer Ex d, and the electronic circuitry chamber is fitted with a bushing for cables, and is interconnected with the ambient environment with a pressure equalizer Ex e.

The main advantage of the luminaire according to the invention as compared to prior art luminaires is the possibility of air exchange with the surrounding environment, eliminating precipitation of water moisture inside the luminaire while maintaining a high IP rating of the luminaire.

In a preferred embodiment, the pressure equalizer Ex d comprises a hollow body with a covering lid and a sealing ring wherein the hollow body is filled with porous metallic filling to ensure air exchange, or pressure equalization, and to extinguish the flame of any possible explosion.

In another preferred embodiment, the pressure equalizer Ex e comprises a hollow body with a covering lid and a sealing ring wherein a membrane is arranged in the hollow body to ensure air exchange between the electronic circuitry chamber and the external atmosphere and to exhaust air humidity.

In another preferred embodiment, the grommet consists of a grommet Ex d.

In another preferred embodiment, the bushing consists of a bushing with the protection Ex e, Ext, IP66, IP68.

BRIEF DESCRIPTION OF DRAWINGS

The invention will be described in more detail with reference to a particular embodiment of a luminaire according to the invention, shown in the attached drawings where.

EXAMPLES OF EMBODIMENTS

Figure 1:
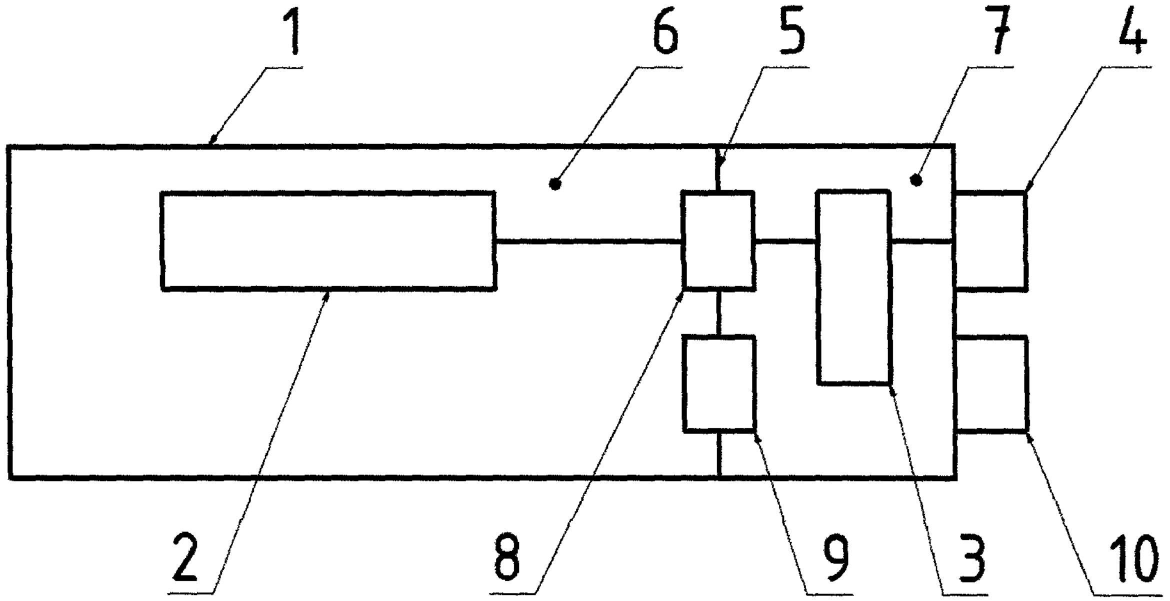
FIG. 1—shows a schematic illustration of a luminaire for an explosive environment FIG. 2—shows an embodiment example of a luminaire for an explosive environment with a glass tube FIG. 3—shows a schematic illustration of the pressure equalizer Ex d FIG. 4—shows a schematic illustration of the pressure equalizer Ex e

The luminaire of FIG. 1 is intended to be used in a Zone 1/21 with the protection Ex de and the ingress protection rating IP68, i.e., in an environment with a possible occurrence of an explosive atmosphere. The luminaire comprises an enclosed housing 1, which is divided with a partition 5 into the light source 2 chamber 6 and into the electronic circuitry 3 chamber 7.

The light source 2 chamber 6 has the protection Ex d, Ex t. The protection Ex d and Ex t is achieved through compliance with the standards EN 60079-0, EN 60079-1 and EN 60079-31, which set forth all applicable requirements from the specification how to design the joints between individual parts of the housing to the compulsory laboratory tests.

Figure 2:
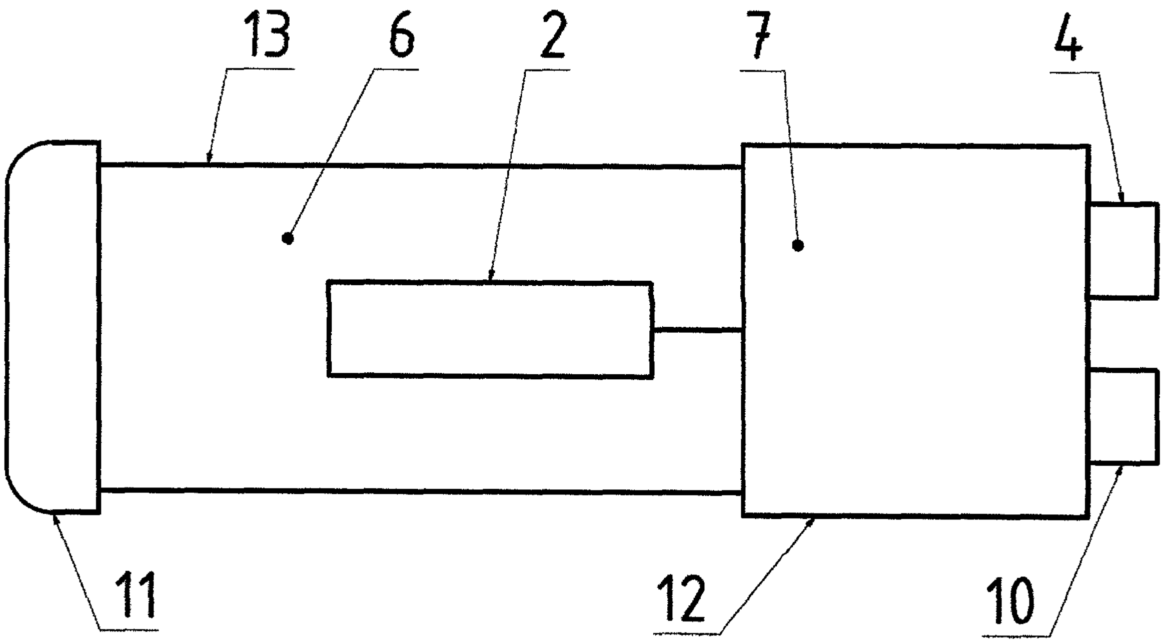

FIG. 2 schematically shows a particular embodiment of an inventive luminaire. The light source chamber 6 consists of a polycarbonate or glass tube 13 that is closed with cast aluminium lids 11, 12 at both sides. In the bigger lid 12, the partition 5 is arranged, and at the same time, there is the electronic circuitry 3 chamber 7, which has the protection Ex e, Ex t. The protection Ex e, Ex t is achieved through compliance with the requirements of the standards EN 60079-0, EN 60079-7 and EN 60079-31, which set forth all applicable requirements from the exact specification of electronic devices that may be installed in the chamber (they must be non-sparking and certified) to the compulsory laboratory tests.

In the light source chamber 6, an aluminium profile is arranged that carries the light source 2 consisting of LED chips at one side, and at the other side, a power supply to transform the alternating current from the mains to direct current to power the light source 2.

In the partition 5 between the chambers 6, 7 (see FIG. 1), a grommet 8 Ex d for cables, and a pressure equalizer 9 Ex d are arranged.

The electronic circuitry 3 chamber 7 is interconnected with the surrounding environment with a bushing 4 for cables with the protection Ex e, Ex t, IP66, IP68, and a pressure equalizer 10 Ex e.

Figure 3:
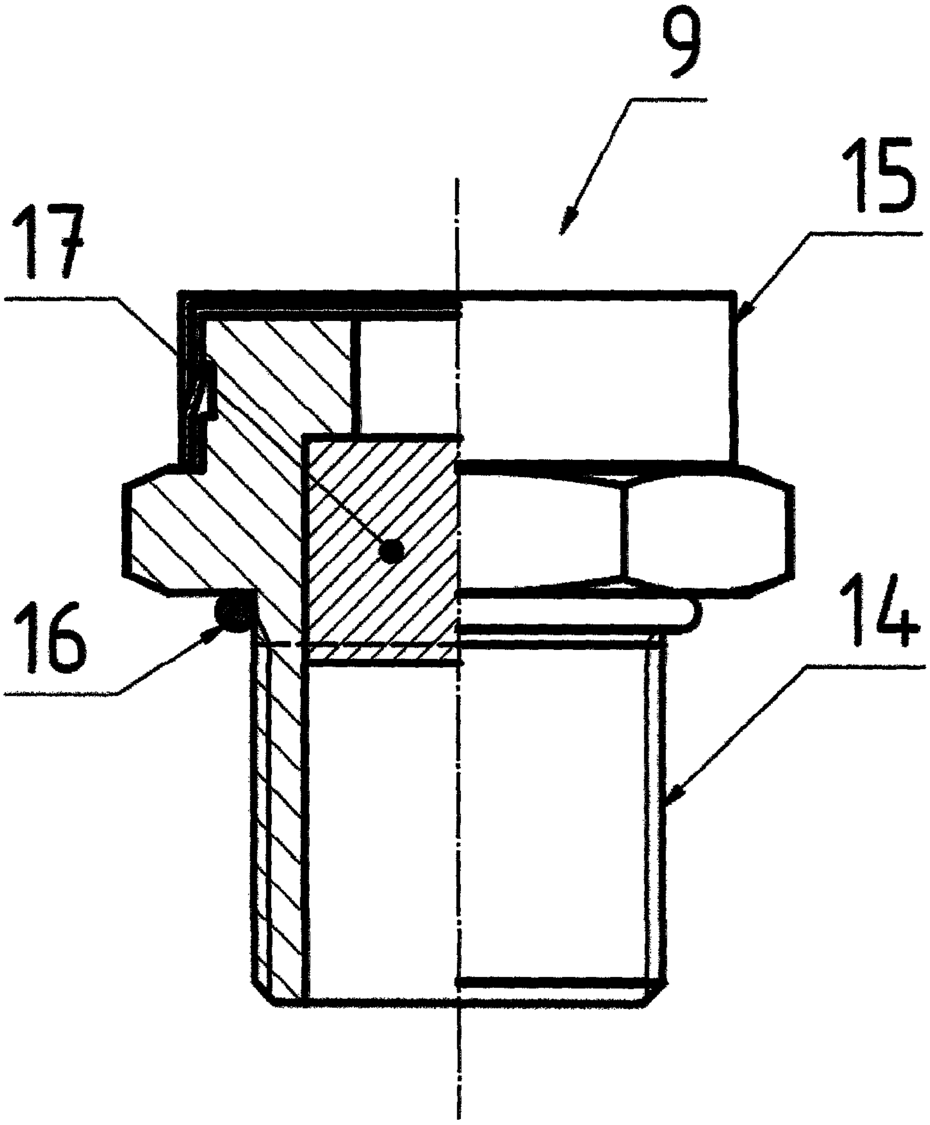

The pressure equalizer 9 Ex d (see FIG. 3), arranged in the partition 5 between the chambers 6, 7, consists of a hollow body 14 with a covering lid 15 and a sealing ring 16 wherein the hollow body 14 is filled with porous metallic filling 17 to ensure air exchange, or pressure equalization, and to extinguish the flame of any possible explosion. In the described embodiment, the metallic filling 17 is made by sintering of metallic balls while maintaining the gaps between them across the entire volume so that the air can flow through the metallic filling 17 in both directions, but in case of an abrupt pressure increase (e.g. explosion), the flow quantity and flow speed is considerably reduced in the porous structure of the metallic filling 17 so that after passing through this filling 17, any possible flame will go out and it will only be the extinguished gas that will be released.

The air flows freely in both directions from the hollow body 14. The covering lid 15 is only a covering element, it does not have any special sealing properties. Along the perimeter of the covering lid 15 there are openings that facilitate the flow. But the covering lid 15 is not applied tightly and all along the perimeter, there are joints between the covering lid 15 and the hollow body 14.

Figure 4:
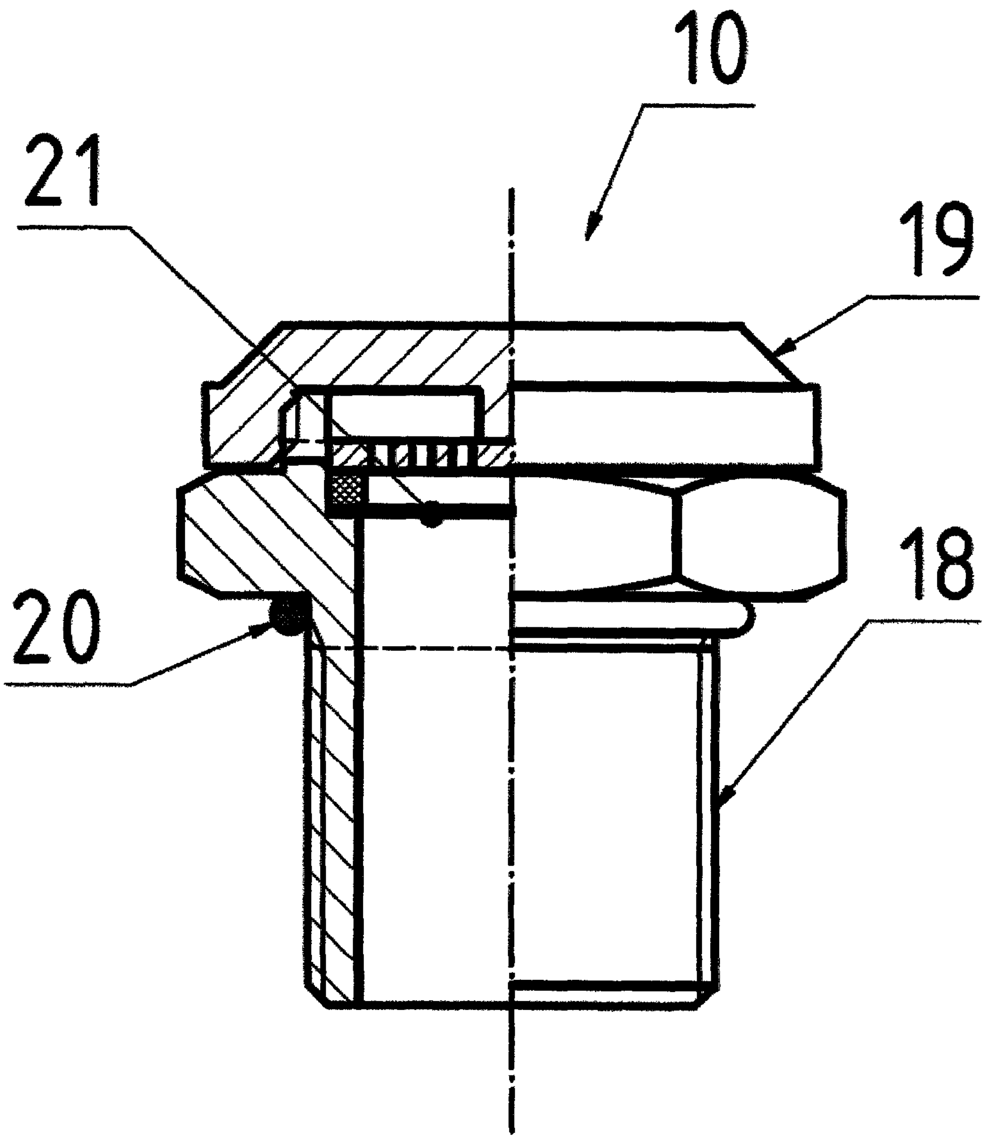

The pressure equalizer 10 Ex e (see FIG. 4) between the electronic circuitry 3 chamber 7 and the external environment consists of a hollow body 18 with a covering lid 19 and a sealing ring 20 wherein a membrane 21 is arranged in the hollow body 18. The pressure equalizer 10 Ex e is designed to ensure air exchange between the electronic circuitry 3 chamber 7 and the external environment, and to exhaust air humidity.

The membrane 21 is permeable so that the air can flow from the hollow body 18 in both directions. The membrane 21 also serves as protection from water so that it should not have a direct path through the pressure equalizer 10 Ex e. A secondary function of the membrane 21 may be such that in one direction it does not let air humidity through (hydrophobic material), but it may not necessarily be the case. Between the hollow body 18 and the covering lid 19, openings are provided to enable free flow of air.

The light source 2, consisting of LED chips, is very efficient and effective, but in spite of this, it transforms a certain percentage of electricity into waste heat. If the surrounding atmosphere is significantly colder than the operation temperature of the luminaire, there is a danger of moisture precipitation in the luminaire, which could cause damage of sensitive electronic components as well as reduction of illumination efficiency.

In the luminaire according to the invention, the problem of water condensation in the inner space of the luminaire is eliminated by the pressure equalizer 9 Ex d between the chambers 6, 7, and subsequently the pressure equalizer 10 Ex e from the electronic circuitry 3 chamber 7 into the external environment ensuring free flow of the atmosphere between the ambient environment and the inner space of the luminaire without affecting the protection level while achieving the ingress protection rating IP66 and IP68 at the same time.

LIST OF REFERENCE SIGNS

1 housing
2 light source
3 electronic circuitry
4 bushing
5 partition
6 light source chamber
7 electronic circuitry chamber
8 grommet for cables
9 pressure equalizer Ex d
10 pressure equalizer Ex e
11 smaller lid
12 bigger lid
13 tube
14 body of the pressure equalizer Ex d
15 covering lid
16 sealing ring
17 metallic filling
18 body of the pressure equalizer Ex e
19 covering lid
20 sealing ring
21 membrane

The invention claimed is:

1. A luminaire, especially for an explosive environment, comprising an enclosed housing (1) in which a light source (2) is arranged with a power supply and electronic circuitry (3), and the housing (1) is fitted with a bushing (4) for cables, wherein the housing (1) is divided with a partition (5) into a light source (2) chamber (6), and into an electronic circuitry (3) chamber (7) wherein in the partition (5)

between the chambers (6, 7), a grommet (8) for cables is arranged as well as a pressure equalizer (9) Ex d, and the electronic circuitry (3) chamber (7) is fitted with a bushing (4) for cables, and is interconnected with the external environment with a pressure equalizer (10) Ex e, wherein the pressure equalizer (9) Ex d comprises a hollow body (14) with a covering lid (15) and a sealing ring (16) wherein the hollow body (14) is filled with porous metallic filling (17) to ensure air exchange, or pressure equalization, and to extinguish the flame of any possible explosion.

2. The luminaire according to claim 1, wherein the pressure equalizer (10) Ex e comprises a hollow body (18) with a covering lid (19) and a sealing ring (20) wherein in the hollow body (18), a membrane (21) is arranged to ensure air exchange between the electronic circuitry (3) chamber (7) and the external atmosphere, and to exhaust air humidity.

3. The luminaire according to claim 1, wherein the grommet (8) consists of a grommet Ex d.

4. The luminaire according to claim 1, wherein the bushing (4) consists of a bushing with the protection Ex e, Ex t, IP66, IP68.

* * * * *